United States Patent [19]
Pfanzeder et al.

[11] Patent Number: 5,094,478
[45] Date of Patent: Mar. 10, 1992

[54] MOTOR VEHICLE HAVING A ROLLOVER BAR

[75] Inventors: Dieter Pfanzeder, Utting; Wolfgang Dangl, Munich; Klaus Kapitza, Baldham; Martin Wegge, Munich; Hagen Schneider, Lohhof; Reinhard Nowack; Gerhard Reuber, both of Drolshagen, all of Fed. Rep. of Germany

[73] Assignees: Bayerische Motoren Werke AG; Alfred Teves GmbH & Co. OHG, both of Fed. Rep. of Germany

[21] Appl. No.: 561,603

[22] Filed: Aug. 2, 1990

[30] Foreign Application Priority Data

Aug. 2, 1989 [DE] Fed. Rep. of Germany ....... 3925515

[51] Int. Cl.⁵ .................. B60R 21/13; B60R 21/02
[52] U.S. Cl. .................................... 280/756; 296/186
[58] Field of Search ............... 280/756; 296/109, 186

[56] References Cited

U.S. PATENT DOCUMENTS 4,557,502 12/1985 Scaduto et al. ................. 280/756
4,700,982 10/1987 Kuraoka et al. ................. 280/756
4,840,398 6/1989 Matthias et al. ................. 280/756

FOREIGN PATENT DOCUMENTS 2916010   10/1980  Fed. Rep. of Germany .
G8523831.7 11/1985 Fed. Rep. of Germany .
3723378    1/1989  Fed. Rep. of Germany ...... 280/756
1059068    2/1967  United Kingdom .............. 280/756
8675       8/1990  World Int. Prop. O. .......... 280/756

*Primary Examiner*—Kenneth R. Rice
*Attorney, Agent, or Firm*—Evenson, Wands, Edwards, Lenahan and McKeown

[57] ABSTRACT

A convertible motor vehicle is provided with two rollover bars which can be swivelled out of a lowered inoperative position into an upwardly directed supporting position and back around a swivel axis fixed at the vehicle and extending essentially in the longitudinal direction of the vehicle. The rollover protection system can be integrated into conventional vehicle concepts in a particularly space-saving and advantageous manner and reduces the risk of injury in the case of a fast, sensor-controlling swinging-up of the rollover bars.

17 Claims, 3 Drawing Sheets

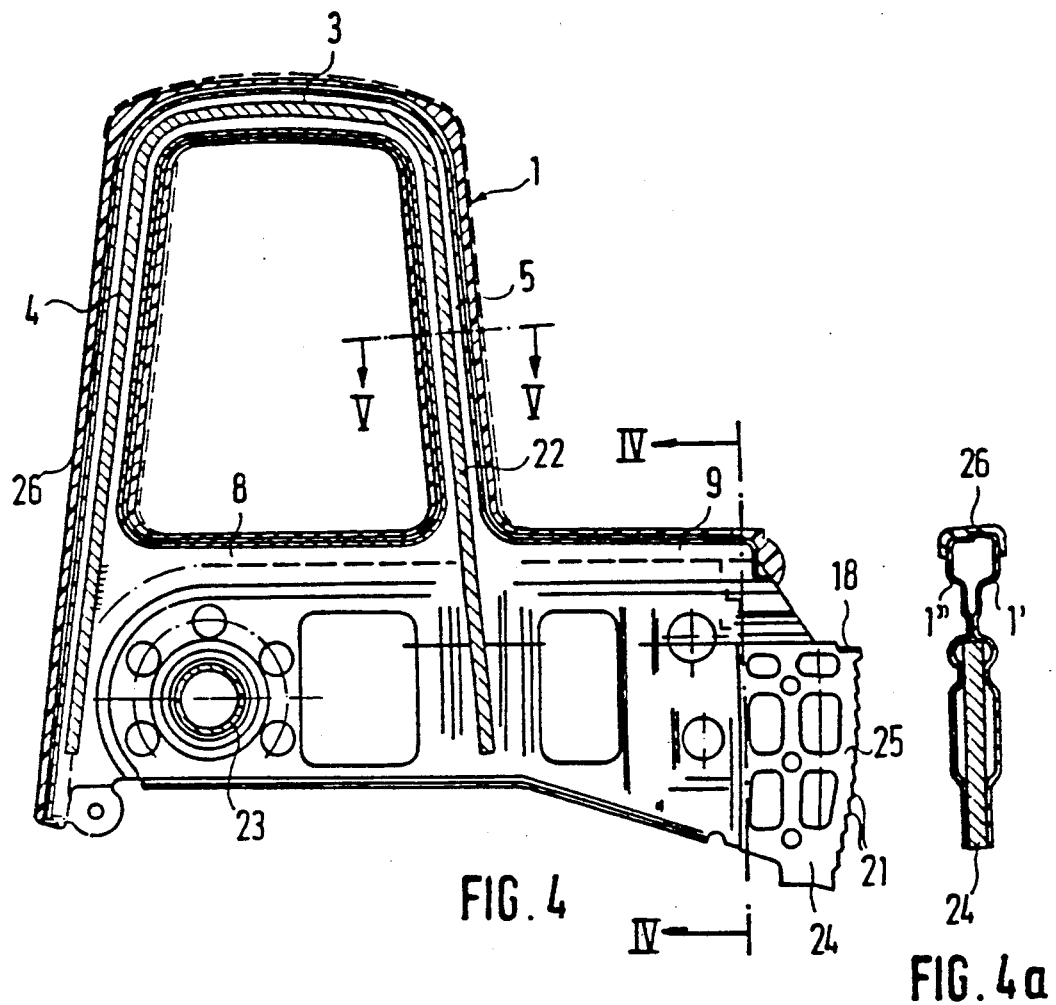
FIG. 4
FIG. 4a
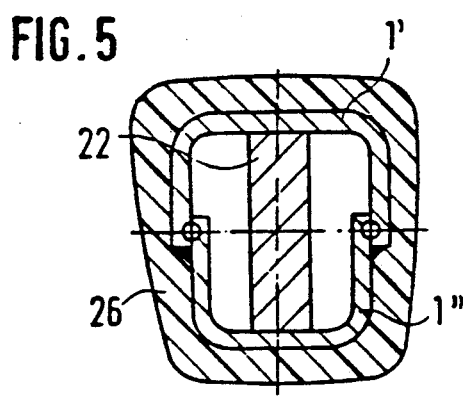
FIG. 5

MOTOR VEHICLE HAVING A ROLLOVER BAR

CROSS-REFERENCE TO RELATED APPLICATIONS

This application is related to application Ser. No. 561,601 filed on Aug. 2, 1990, in the name of Wolfgang Dangl, Gerald Schick, Reinard Nowack and Gerhard Reuber and entitled "A MOTOR VEHICLE ROLLOVER BAR DRIVING SYSTEM".

BACKGROUND AND SUMMARY OF THE INVENTION

The present invention relates to a motor vehicle, particularly a convertible, having a rollover bar which can be swivelled around a swivel axis fixed at the vehicle from a lowered inoperative position into a upwardly directed supporting position and back.

Rollover bars of this type are known as shown in DE-PS 34 10 676 and DE-PS 37 32 562. They essentially have a U-shape with a U-web extending approximately along the whole width of the vehicle. At the free ends of the U-legs, the rollover bars are connected with the vehicle body in such a manner that they can be swivelled around a transverse axis of the vehicle. The rollover bars are equipped with driving systems which, in a sensor-controlled manner, swivel the bar very rapidly into its upwardly directed supporting position. It is a disadvantage in this case that the bars move in the direction of the vehicle occupants' heads. In addition, it is difficult to integrate the swivel bearings and the driving mechanism into the vehicle concept.

A U-shaped rollover bar shown in DE-OS 15 55 955 extends approximately along the whole width of the vehicle and the lateral U-legs thereof can be displaced in vertical guides. The bar, in a sensor-controlled manner, can also be displaced from its pushed-in inoperative position into the extended supporting position. This construction results in technical difficulties because, during the extending and retracting, one side of the bar may tilt with respect to the other side of the bar, so that the operational reliability is questionable.

It is an object of the invention to provide a motor vehicle having a rollover bar of the above-mentioned type that offers as much safety as possible and, in a space-saving manner, can be integrated into conventional vehicle concepts.

According to the present invention, this object has been achieved by providing a rollover bar which can be swivelled around a swivel axis extending essentially in the longitudinal direction of the vehicle. It is also advantageous to provide two rollover bars which can be swivelled around at least approximately parallel swivel axes. A rollover protection system of this type can be integrated relatively easily into a vehicle concept in the area of the rear partition. In this case, the rollover bars swivel out of a pocket-type indentation in upward direction essentially in the plane of the bar. They are therefore moved past the vehicle occupants' heads in the rear and are not moved in the direction of the heads. Should one of the two bars not or no longer be operative, the other bar still offers good protection against rollover.

BRIEF DESCRIPTION OF THE DRAWINGS

These and other objects, features and advantages of the present invention will become more apparent from the following detailed description of a presently preferred embodiment when taken in conjunction with the accompanying drawings wherein:

FIG. 4 is a sectional view of a rollover bar approximately in the plane of the bar;

FIG. 4a is a sectional view along line 4—4 in FIG. 4;

FIG. 5 is a sectional view along line V—V in FIG. 4;

DETAILED DESCRIPTION OF THE DRAWINGS

Figure 1:
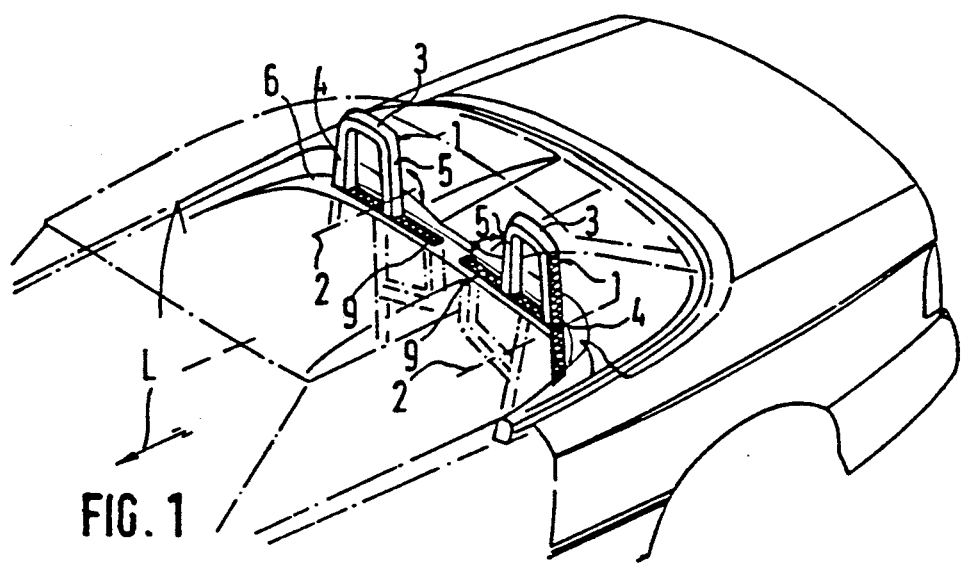
FIG. 1 is a perspective partial view of the rear area of a motor vehicle constructed as a convertible with upwardly swivelled rollover bars.
Figure 2:
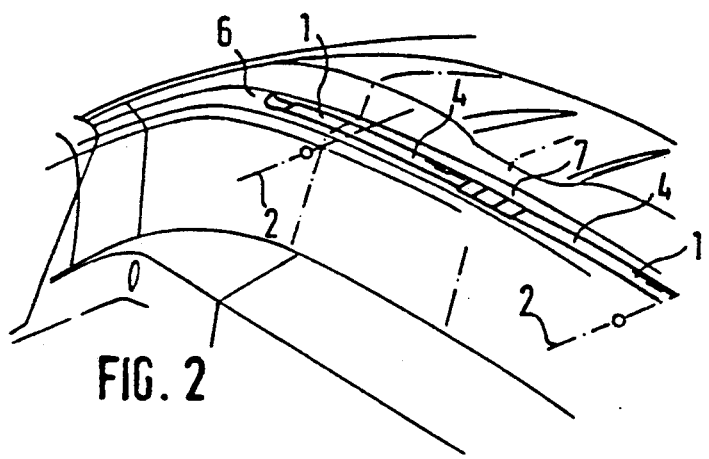
FIG. 2 is a partial view similar to FIG. 1 with swivelled-in rollover bars.

FIGS. 1 and 2 show the rear area of a convertible motor vehicle. A rollover protection system is integrated into the vehicle body and, in the case of the illustrated embodiment, comprises two rollover bars 1 which can each be swivelled around a swivel axis 2 which extends essentially in the longitudinal direction L of the vehicle. In FIG. 1, the rollover bars 1 are shown in full lines in the upwardly directed, supporting position and by dash-dot lines in the swivelled-in inoperative position. The bars 1 swivel in an approximately perpendicular transverse plane of the vehicle. In this manner, they require little installation space, can be integrated easily into existing vehicle concepts, and reduce the risk of injury to vehicle occupants when they are quickly swivelled out into the supporting position. The fast swivelling-out takes place by a suitable drive which becomes operative when a signal of a rollover sensor is present. However, the rollover bars may also be swivelled in and out manually in an arbitrary manner.

As shown, the swivel axes 2 are provided in the lateral areas of the vehicle body, thus in relatively stiff areas of the vehicle body. This ensures a good introduction of the forces which, in the case of a rollover, are transmitted to the vehicle body by way of the bars.

The rollover bars 1 have an essentially U-shaped basic construction. In the upright supporting position, the U-web 3 extends in the transverse direction of the vehicle, while the U-legs 4 and 5 extend downward from the web 3. In the lowered inoperative position (FIG. 2 and 3a), the rollover bars 1 have a contour which is flush with the adjacent vehicle surfaces 6 and 7. According to FIG. 3a, the outer side of the U-leg 4 for this purpose extends flush with the adjacent vehicle surfaces 6 and 7.

Figures 3A, 3B:
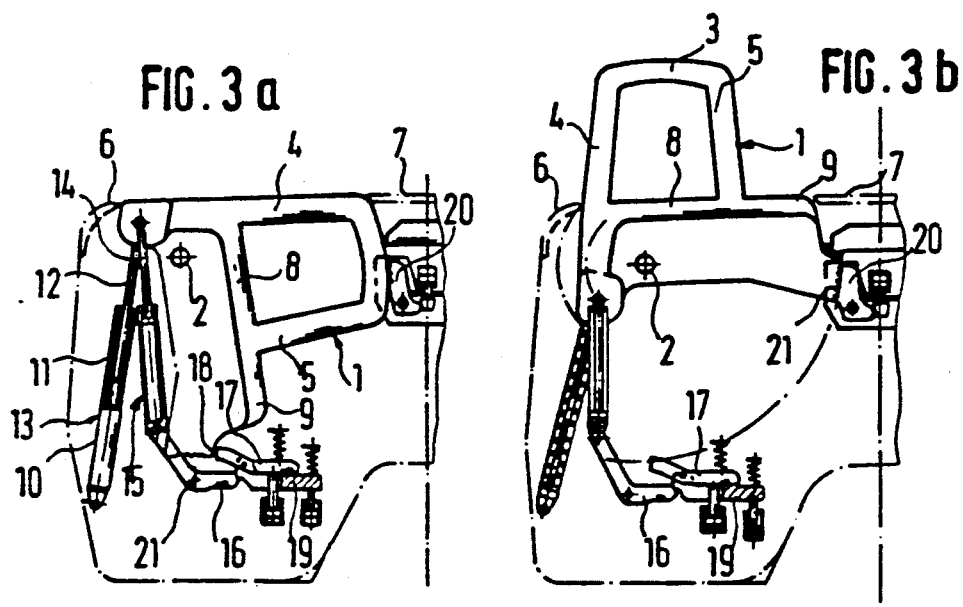
FIG. 3a is a partially schematic longitudinal view of one vehicle half with a swivelled-in rollover bar.
FIG. 3b is a view corresponding to FIG. 3a, but with a rollover bar situated in the supporting position.

As shown particularly in FIGS. 3a and 3b, the essentially U-shaped rollover bar 1 is supplemented by a transverse web 8 to form a closed frame. In this case, the design of each bar is advantageously such that, in the erected supporting position (FIG. 3b), the top side of the transverse web 8 also extends flush with the adjacent vehicle surfaces 6 and 7. In the case of the illustrated embodiment, an extension 9 which is in alignment with the transverse web 8 also in each bar projects away laterally from the leg 5. In the extended position according to FIG. 3b, the rollover bar 1 with the transverse web 8 and the extension 9, in turn, covers the entire move-out opening in a flush manner so that also when the rollover bars 1 are moved out, a good appearance can be achieved.

FIGS. 3a and 3b outline the driving mechanism for the swivelling of the rollover bars, the blocking mechanism for the holding of the bars in the retracted position and the locking mechanism for fixing the bar in the extended position.

At a lateral distance from the swivel axis 2, the rod 12 of a spring element 13 is applied which is guided in a cylinder 10 and is loaded by a spring 11, this spring element supporting itself with its lower end on the vehicle body. The piston rod 14 of a double-action hydraulic cylinder 15 is also applied to the same point of the rollover bar 1, this hydraulic cylinder 15 supporting itself on the bottom in an articulated manner at one end of a two-armed rocker 16 disposed in an also articulated manner on the body.

One end of a spring-loaded double-armed lever 17 holds the rollover bar 1 in its swivelled-in position (FIG. 3a) by way of a suitable holding projection 18. When the other end of the lever 17 is swivelled upward against the force of a spring, the rollover bar 1 is released and may, for example, be moved arbitrarily upwards by a hydraulic cylinder 15. An actuation of the other end of the lever 19, i.e., its right end, as shown in FIG. 3a, in the upward direction causes not only releases the rollover bar 1, but also releases of the rocker 16 and thus the lower support of the hydraulic cylinder 15 so that, under the effect of a spring element 13, the rollover bar 1 is swivelled upward very rapidly. In its upright position (FIG. 3b), the rollover bar is locked against a swivelling-back by a spring-loaded pawl 20 which interacts with a suitable tooth contour 21 of the bar.

FIG. 4, and particularly FIGS. 4a, 5 illustrate that the rollover bar is formed essentially from two sheet metal shells 1' and 1" which at the edges are fitted into one another and welded together with one another. In the area of the web 3 as well as of the legs 4 and 5 of the U-shaped rollover bar 1, the sheet metal shells 1' and 1" enclose a reinforcing strap 22 which extends still farther downward beyond the transverse web 8. The reinforcing strap 22, on the one hand, is used for increasing the stiffness of the rollover bar 1 and, on the other hand, also as a spacing element during the welding-together of the two sheet metal shells 1' and 1".

According to FIG. 4, the bearing bush 23 of the swivel bearing of the rollover bar 1 is provided on the side of the rollover bar 1 facing away from the extension 9. At the other end area, that is, at the area of the rollover bar 1 which, in the supporting position, is situated below the extension 9, a locking element 24 is provided. The locking element 24 comprises an arcuate tooth segment which is curved around the swivel bearing, that is, the bearing bush 23, and the tooth contour 21 can be engaged by spring-loaded pawl 20 which is shown in FIGS. 3a and 3b.

The visible are of the rollover bar 1 is surrounded with a foam covering 26 which has a stylistic and an impact-reducing function.

Figure 6:
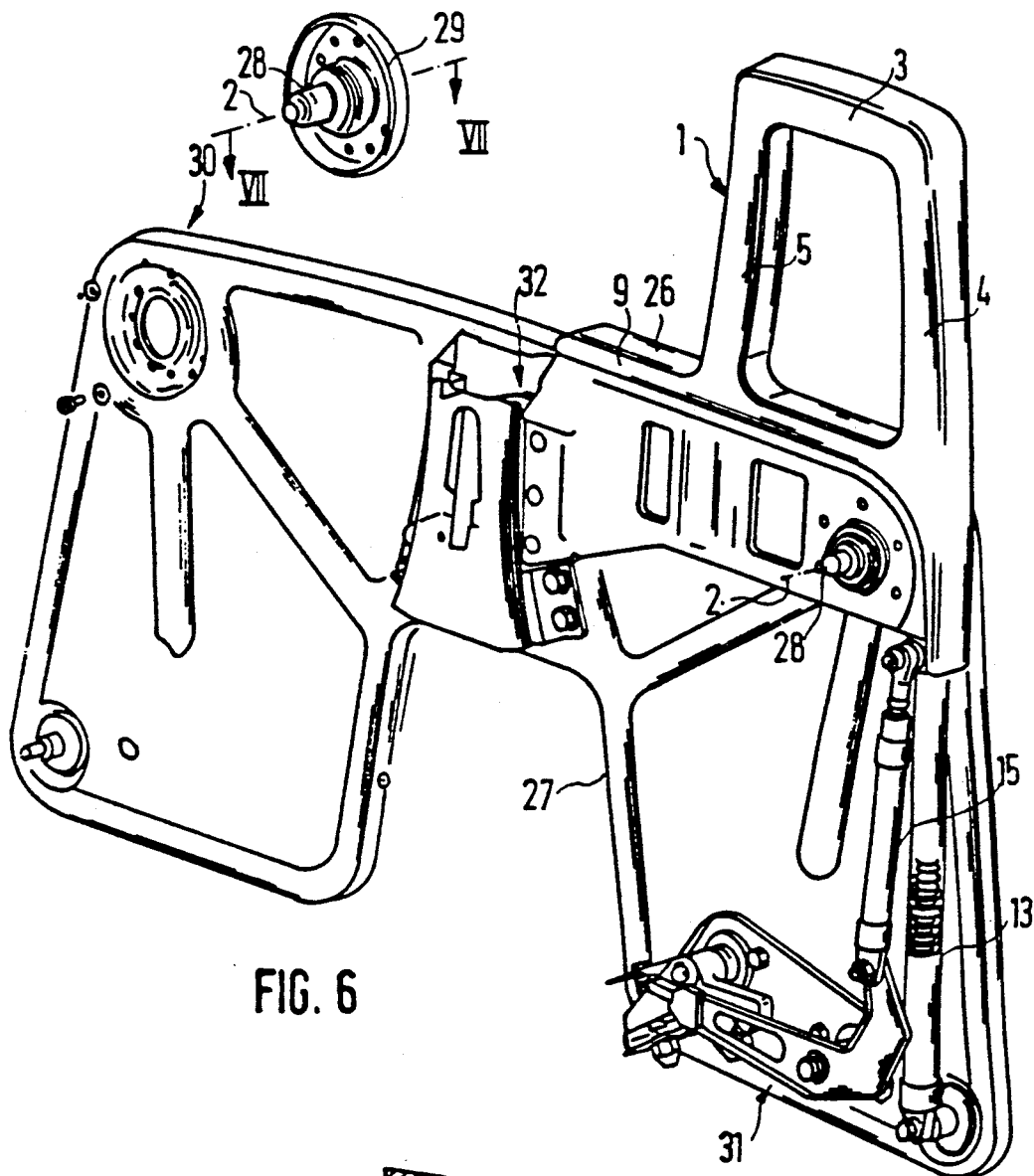
FIG. 6 is a perspective view of the base plate providing a bearing for the rollover bar together with the rollover bar.
Figure 7:
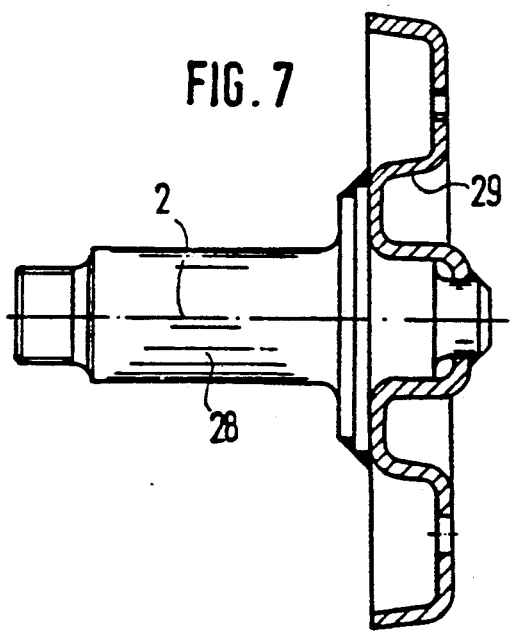
FIG. 7 is a sectional view along line VII—VII in FIG. 6.

According to FIG. 6, which has a component shown in FIG. 7 exploded out of perspective, each rollover bar is disposed on a base plate 27 which can be fastened in the vehicle. This permits not only a particularly flat, space-saving construction but also a pre-assembly of the whole rollover system. A bearing bolt 28 of each rollover bar 1 is welded together with the central area of a reinforcing pot 29. In its outer area, the reinforcing pot 29 is form-lockingly accommodated in a corresponding recess 30 of the base plate 27 and is screwed together with it. The pot 29 and the adjacent sheet metal areas of the base plate 27, in this manner, have diaphragm-type characteristics which, by predominantly elastic deformation, absorb force peaks exercised on the bearing of the rollover bars.

The base plate 27 carries the holding systems 31 for the rollover bars 1, when moved into the lowered position, namely the driving systems, comprising the spring element 13, the hydraulic cylinder 15 for the swivelling of the rollover bars 1 and the locking devices 32 for the extended rollover bars 1.

The base plate 27, which itself also has a very stable construction, is screwed to the vehicle body in the area of the swivel axis 2 and of the reinforcing pot 29. Additional connections with the vehicle body are provided in the area of the locking device 32 as well as in the lower sections of the base plate 27. In the assigned partial area of the vehicle body, the base plate 27 is already particularly stiff or can easily be stiffened. This results not only in a favorable introduction of force into the body structure in the case of a rollover, but the construction with the base plate which can advantageously be integrated into the vehicle body also ensures high operational reliability because the adjustment of the control and locking elements is even maintained in the case of certain distortions or other deformations of the vehicle body.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle, particularly a convertible, having at least one rollover bar which can be swivelled around a swivel axis fixed at the vehicle from a lowered position where the bar is flush with adjacent upper surfaces of the vehicle into a generally vertically directed supporting position within the confines of a passenger compartment of the vehicle and back to the lowered position, wherein the rollover bar is operatively mounted to be swivelled around a swivel axis extending essentially in the longitudinal direction of the vehicle.

2. The motor vehicle according to claim 1, wherein the at least one rollover bar comprise two rollover bars swivelled around approximately parallel swivel axes.

3. The motor vehicle according to claim 2, wherein the rollover bars are disposed on a base plate fastened in the vehicle.

4. The motor vehicle according to claim 3, wherein a reinforcing pot is, in an outer area, is accommodated in a corresponding recess of the base plate and is screwed together with it and bearing bolts for each rollover bar are connected with the central area of the reinforcing pot.

5. The motor vehicle according to claim 3, wherein the holding mechanisms for the rollover bars in the lowered position, driving systems for moving the rollover bars into the supporting position and locking devices for the rollover bars in the supporting position are arranged on the base plate.

6. The motor vehicle according to claim 1, wherein the swivel axis is provided in the lateral areas of the vehicle body.

7. A motor vehicle, having at least one rollover bar which can be swivelled around a swivel axis fixed at the vehicle from a lowered position into an upwardly directed supporting position and back to the lowered position, wherein the rollover bar is operatively mounted to be swivelled around a swivel axis extending approximately in the longitudinal direction of the vehicle and a vehicle body opening accommodates the at least one rollover bar in the lowered position and is covered by parts of the at least one rollover bar in the supporting position.

8. A motor vehicle, having at least one rollover bar which can be swivelled around a swivel axis fixed at the vehicle from a lowered position into an upwardly directed supporting position and back to the lowered position, wherein the rollover bar is operatively mounted to be swivelled around a swivel axis extending approximately in the longitudinal direction of the vehicle and the at least one rollover bar is essentially U-shaped with legs jointed by a web, and an outer side of one leg having a contour which extends flush with adjacent vehicle surfaces in the lowered position of the rollover bar.

9. The motor vehicle according to claim 8, wherein the at least one essentially U-shaped rollover bar has a transverse web to form a closed frame, and in the supporting position, the top side of the transverse web extends approximately flush with the adjacent vehicle surfaces.

10. The motor vehicle according to claim 9, wherein an extension projects laterally from at least one of the legs of the at least one essentially U-shaped rollover bar and is aligned with the transverse web.

11. The motor vehicle according to claim 10, wherein in the supporting position, an opening in the vehicle body is covered essentially by the transverse web and the extension.

12. The motor vehicle according to claim 10, wherein a swivel bearing is provided on the side of the at least one rollover bar facing away from the extension.

13. The motor vehicle according to claim 10, wherein a locking element is provided in the area of the at least one rollover bar which, in the supporting position, is situated below the extension.

14. The motor vehicle according to claim 13, wherein the locking element has an arcuate tooth segment curved around the swivel bearing and a tooth contour with which a spring-loaded pawl on the vehicle body is operatively associated.

15. A motor vehicle, having at least one rollover bar which can be swivelled around a swivel axis fixed at the vehicle from a lowered position into an upwardly directed supporting position and back to the lowered position, wherein the rollover bar is operatively mounted to be swivelled around a swivel axis extending approximately in the longitudinal direction of the vehicle and the rollover bar comprises two sheet metal shells which, at their edges, are fitted into one another and welded together.

16. The motor vehicle according to claim 15, wherein the at least one rollover bar is essentially U-shaped with legs and a web, and the sheet metal shells enclose a reinforcing strap in the area of the legs and of the web of the at least one essentially U-shaped rollover bar.

17. The motor vehicle according to claim 16, wherein a transverse web is provided in the at least one rollover bar, and the reinforcing strap extends beyond the transverse web.

* * * * *